3,170,887
VIBRATION DAMPING COMPOSITION AND
METHOD OF MAKING SAME
Thomas Ramos, 536 Fort Washington Ave.,
New York, N.Y.
No Drawing. Filed Nov. 14, 1962, Ser. No. 237,768
15 Claims. (Cl. 260—18)
(Granted under Title 35, U.S. Code (1952), sec. 266)

The invention described herein may be manufactured and used by or for the Government of the United States of America for governmental purposes without the payment of any royalties thereon or therefor.

This invention relates to the damping of the vibrations of an object or wall, and particularly to a method and composition for use in accomplishing such damping.

The damping of the vibrations of a body or wall has become an increasingly urgent problem, particularly, for example, the damping of the vibrations of walls of a ship to prevent or limit the propagation into the water in which the ship is traveling, of vibrations of machinery and other mechanisms within or carried by the ship. This has recently become of extreme importance in order to prevent or limit the detection or location of such a ship by sonar detection systems. Modern sonar detection systems are very sensitive to sounds propagated in the sea by operating mechanism in a ship, particularly of submarines, so that satisfactory plans for decreasing or limiting the vibrations of parts of a ship caused by its necessarily operating mechanism or machinery, for national defense purposes, are currently of major importance. Various plans for causing the decrease or elimination in such vibrations of a ship, that can be propagated in the sea, have been proposed, but have not been as satisfactory as desired, particularly in naval vessels.

An object of this invention is to provide an improved method and composition for application to vibratile objects and walls to damp their vibrations, which will cause the objects and walls to have an exceptionally rapid vibratory decay period, which is readily applicable to the walls and objects of a ship to damp their vibrations and thus reduce the possibility of the detection of such a ship by sonar detection systems, which can be easily applied to ships, and which will be exceptionally effective in damping vibrations of an object or wall, and relatively inexpensive to apply.

Another object is to provide an improved vibration damping composition, which can be easily applied to a vibratile object or wall whose vibrations are to be damped, which is fire resistant, which is exceptionally effective in causing rapid decay in the vibrations of such object or wall, and which is practical, durable, effective, resistant, to moisture and deterioration in use, and relatively inexpensive.

Other objects and advantages will be apparent from the following description of a number of examples of the invention, and the novel features will be particularly pointed out hereinafter in connection with the appended claims.

I have discovered that by confining against a face or surface of a vibratile object or wall, plates or tiles a composition prepared in accordance with this invention, the vibration of such object or wall is quickly and effectively damped, with exceptionally rapid decay of the vibrations. The composition is a cured mixture of an epoxy resin, a long chain, amine terminated polyamide resin, a plasticizer for such resins, and a hardener and curing agent for such resins. While the epoxy resin may advantageously be used in as little as 10 parts by weight for each 100 parts by weight of the polyamide resin, for best results the relative proportions of the components are, in parts by weight, about 20 to 40 parts of the epoxy resin, about 100 parts of the long chain, amine terminated polyamide resin, about 35 to 45 parts of the plasticizer, and about 1.8 to 20 parts of a hardener and curing agent. As the plasticizer, I have found that chlorinated paraffin is particularly useful and it has the added advantage that it is a flame retardant. The chlorinated paraffin for best results should have a chlorine content not materially in excess of about 50% by weight, because if such chlorine content is materially more than about 50% by weight, the end product of the mixture may turn black or to a dark color and becomes crystalline and has little or no flexibility. The rate and degree of cure is also then increased and the flexibility and flexibility retention fall off when the chlorinated paraffin has more than about 50% by weight chlorine content, and is used as a flame retardant or as a bifunctional plasticizer and flame retardant. Where color is important, the use of a chlorinated paraffin is undesirable when also using amines or amine complexes as curatives or in the composition, because an exothermic reaction may occur between the chlorinated paraffin and amines, which causes a more or less pronounced yellowing of the mixture or composition. If additional external heat is used to obtain a thorough cure for the composition, excessive darkening of color of the composition usually occurs.

For the best results so far, I have found that the epoxy resins most useful are those having an epoxide equivalent (grams of resin containing one gram equivalent of epoxide) between about 170 and 300. Epoxy resins that are useful in this composition are marketed under the trademark "Epon" and specimens are identified as follows.

| Epoxy resin: | Epoxide equivalent |
|---|---|
| Epon 815 | 175–205 |
| Epon 820 | 185–205 |
| Epon 828 | 185–205 |
| Epon 834 | 225–290 |

Epoxy resins are known under that chemical name and are condensation products of epichlorohydrin with dihydric diphenols, such as bis(4-hydroxyphenyl)dimethylmethane. They are also described in a book "Epoxy Resins" by Lee and Neville, published in 1957 by McGraw-Hill Book Company, Inc. of New York, New York. The "Epon" resins known as "Epon" 815, 820, 828, and 834, were so identified merely by way of example. The properties of these "Epon" resins are set forth collectively in a technical bulletin SC:60–39 Rev., published by Shell Chemical Company. The "Epon" resins 812; 815; 820; 826; 828; 830; 834; 834–X–90 and 836; 836–C–75 for example, are described and the structural formula of the base resin thereof given in Shell Chemical Company technical bulletins SC:60–142; SC:60–143; SC:60–144; SC:60–145; SC:60–146; SC:60–147; SC:60–148; SC:60–149; SC:60–150 and SC:60–151, respectively all published prior to applicant's filing date.

Epoxy resins useful for this composition are marketed under the trademark "Araldite" and specimens are identified as follows:

| Epoxy resin: | Epoxide equivalent |
|---|---|
| Araldite 502 | 263 |
| Araldite 6005 | 192 |
| Araldite 6020 | 204 |
| Araldite 6030 | 217 |
| Araldite 6010 | 196 |

The epoxy resins as marketed by the Ciba Products Corp. under the trademark "Araldite" are described in technical bulletins of that corporation as follows:

"Araldite" _____ 502 in bulletin #4.
"Araldite" _____ 6005 in bulletin #20.
"Araldite" _____ 6020 in bulletin #6.
"Araldite" _____ 6030 in bulletin #10210.
"Araldite" _____ 6010 in bulletin #7.

All of these bulletins were published prior to applicant's filing date.

"Epoxy" resins are widely used and need no further description, but they are manufactured chiefly by reacting epichlorohydrin with bis(4 - hydroxyphenyl)dimethylmethane. They are described and their structural formula given in Modern Plastics Encyclopedia of 1960, published by Breskin Publications, 575 Madison Avenue, New York 22, New York, to which publication reference may be had for further information about epoxy resins.

Several examples of the composition, before curing are given below:

*Example I*

| Component | Function | Parts by Weight |
|---|---|---|
| Chlorinated Paraffin | Flame retardant | 42 |
| Epoxy resin | Co-reactant | 20 |
| "Versamid 115" | do | 100 |
| "DMP-30" | Hardener and curing agent | 5 |

"Versamid 115" as marketed under that trademark is a long chain, amine terminated, polyamide resin. Other "Versamid" polyamide resins which have been successfully used in place of "Versamid 115" are "Versamids" 100, 125, 140, 400, 401 and 415.

Versamid polyamide resins are long chain linear polymers derived from the reaction of dimerized linoleic acid with di- or polyamines. They have been defined in the book "Epoxy Resins" earlier above-identified, as condensation of polymers of dimerized (and trimerized) vegetable oil, unsaturated fatty acids and aryl or alkyl polyamines. The following represents a typical reaction of the dibasic acid with a polyamine:

$_n$HOOC—R—COOH+$_n$H$_2$NR'
→NH$_2$HO(OC—R—CONHR'—NH)$_n$H

R, R' and $n$ vary in the different grades of Versamids. When the polyamine has a high functionality, the resultant Versamid will have active amine groups spaced along the molecule.

The "Versamid" polyamide resins are collectively described in Technical Bulletins 11-D-3; 11-E-1; 11-F-2; 11-G-140; 11-D-3a; 11-D-3; data sheet 11 and others, all published by the Chemical Division of General Mills, Inc. in 1960, which is prior to applicant's filing date. The product DMP-30 used as a hardener and curing agent is marketed under that name by Rohm & Haas Co. of Washington Sq., Philadelphia 5, Pennsylvania, and is identified chemically as 2,4,6-tri(dimethylaminomethyl) phenol, postulated to have the structural formula of:

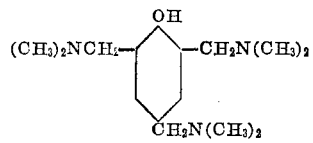

They are commonly called dimethylaminomethyl phenols. Salts of "DMP-30," such as the triacetate, the tribenzoate, and the tri-2-ethyl hexoate are useful as epoxy resin curing agents. The tri-2-ethyl hexoate salt of DMP-30, is a very widely used, tertiary amine salt catalyst for epoxy resins. These dimethylaminomethyl phenols are further described in a bulletin published by said Rohm & Haas Company and identified as SP-62 dated November 1958.

The component parts listed above in this example, are mixed in the order listed, each ingredient being added to the mixture successively and thoroughly blended in prior to the addition of the next ingredient. Following the addition of the last ingredient, the mixing should continue for about 15 to 20 minutes to assure thorough blending. Mixing conditions and speed should be adjusted to prevent excessive incorporation of entrained air into the mixture. If the "Versamid" collects at the side of the container, it should be scraped off of the sides of the container and blended into the mixture. The final mixture should have a density of approximately 96 lb./cu. ft. The final mix is charged into appropriate molds designed to produce an end product which is smooth and flat, and of the desired weight per sq. ft. The material, after it is charged into the molds, should be allowed to cure, either at room temperature (70°–80° F.) for about 96 hours, or at 160° F. for about ten to twelve hours, prior to removal from the mold. The material so prepared is preferably formed into flat tiles that measure about 1 foot by 1 foot, and a thickness of about ½ inch. These tiles are arranged edge to edge and confined or cemented against the face of a wall or body whose vibrations are to be damped, such as to a face of the steel hull plating of a ship.

Other plasticizers useful for epoxy and polyamide resins may be used in place of chlorinated paraffins, and include, by way of example the following, which are all liquid esters:

Tricresyl phosphate
Triphenyl phosphate
Tris-B-chlorethyl phosphate
Octyl diphenyl phosphate
Dibutyl phthalate
Dicapryl phthalate
Diethyl phthalate
Dimethyl phthalate
Di-2-ethylhexyl adipate
Di-iso-octyl adipate
Dibutyl sebacate
Di-iso-octyl sebacate
Dioctyl sebacate Chlorinated paraffins may be used in conjunction with any of the above plasticizers to impart flame retardance.

Other curing agents used in connection with epoxy and polyamide resins may be employed in place of and in conjunction with "DMP-30," and may include the following:

Aliphatic amines:
    Diethylenetriamine
    Triethylenetetramine
    N-aminoethylpiperazine
    Epon Curing Agent U
    Epon Curing Agent T1
    Tetraethylenepentamine
    3-isopropylaminopropylamine
    Trimethylenediamine
    Propylene diamine The Epon Curing Agents, U, T1 and Z are described fully in Technical Bulletins SC:60-39 Rev. and SC:60-302.2 of the Shell Chemical Co.

Aromatic Amines:
    Metaphenylenediamine
    Methylenedianiline
    Epon Curing Agent Z
    4,4'-diaminodiphenylsulfone As a general criterion, the particular curing agent employed in these examples will be determined by the maximum operating temperature limits and flexibility of the cured composition. Since the curing agent used in this composition mixture becomes an integral part of the cured composition, the type and amount of curing agent employed has a profound effect on the sound or vibration damping properties of the cured composition. The recommended concentration ranges of the amine curing agents for this damping composition are from about 1.8 to 20 parts amine to 100 parts of the "Versamid 115" (polyamide resin).

The following generalizations should prove useful in selecting other amines for use in this composition:

(a) To be useful as room temperature curing agents for this composition, the amines or amine mixtures must have an average functionality greater than about 2, i.e., more than 2 amine hydrogens per molecule.

(b) Aromatic amines, those which have the amine groups attached directly to a benzene ring or other aromatic nucleus, are usually suitable as room temperature curing agents for this composition.

(c) Provided that suitable curing agents, as defined in (a) or (b) above, are used, the degree of cure, as measured by hardness, solvent resistance and/or flexibility, increases with functionality of the amine and decreases as the distance between amine hydrogens increases.

(d) Flexibility and flexibility retention fall off with increasing degree of cure.

*Example II*

A mixture was made in the manner explained in connection with Example I but with the following composition:

| Component: | Parts by weight |
|---|---|
| "Versamid 115" | 100 |
| "Epon 828" | 20 |
| "Halowax 4004" | 42 |
| "DMP-30" | 5 |

The "Halowax 4004" is a chlorinated paraffin marketed under the trademark "Halowax" and it is a liquid, 40% chlorinated paraffin. It is described in technical bulletin Halowax–4004 published by Koppers Co. Inc. on July 15, 1959.

*Example III*

| Component: | |
|---|---|
| "Versamid 115" | 100 |
| "Epon 828" | 30 |
| "Halowax 4004" | 42 |
| "DMP-30" | 5 |

*Example IV*

| Component: | |
|---|---|
| "Versamid 115" | 100 |
| "Epon 828" | 40 |
| "Halowax 4004" | 42 |
| "DMP-30" | 5 |

*Example V*

| Component: | |
|---|---|
| "Versamid 115" | 100 |
| "Epon 828" | 40 |
| Dibutyl phthalate | 8 |
| Diethylene triamine | 4 |

*Example VI*

| Component: | |
|---|---|
| "Versamid 115" | 100 |
| "Epon 828" | 40 |
| Tris-B-chloroethyl phosphate | 25 |
| Diethylene triamine | 4.4 |

*Example VII*

| Component: | |
|---|---|
| "Versamid 115" | 100 |
| "Epon 828" | 40 |
| Tris-B-chlorethyl phosphate | 56 |
| Tetraethylenepentamine | 20 |

*Example VIII*

| Component: | |
|---|---|
| "Versamide 115" | 100 |
| "Epon 828" | 15 |
| Tris-B-chlorethyl phosphate | 28.75 |
| Diethylenetriamine | 1.80 |
| "Chlorowax 40S" (chlorinated paraffin) | 15 |

Chlorowax 40S is described in a technical bulletin entitled "Diamond Chlorowax," published in 1958 by Diamond Alkali Company.

In all of the examples, the ingredients or components are mixed in the order as listed, as explained in connection with Example I. The compositions made in accordance with this discovery, and as illustrated by the examples given above, when confined, bonded, affixed, or cemented to a vibratile body or wall will effectively and quickly damp the vibrations of such body or wall in an exceptionally short vibratory decay period. The new compositions are also fire resistant, and also resistant to moisture and deterioration in use, but should not be used on walls of containers for petroleum products and other materials that will chemically modify the compositions.

The characterizing properties of the product embodying the invention and made in accordance with the process of this invention, may vary somewhat with the use of different batches of commercial epoxy resins, curing agents and plasticizers, so that systems cured with the same commercial curing agents under identical or corresponding conditions may or may not produce a product always with identical properties. Changes in the production techniques for the chemical compounds and/or components used or involved with respect to this invention may, over a period of time, have a considerable or cumulative effect on the cured system, and hence periodic re-evaluations may be advisable. It should be noted that one specific property may be optimum with one specific curing agent, resin or plasticizer, a second specific property may be optimum with another specific curing agent, resin or plasticizer, or with different proportions used, and so on. With different batches of mixes some characterizing properties may vary greatly due to variations in the commercial materials employed and in the operating conditions existing while the product is being made. Because of the variations in batch properties and materials, cure cycles and design objectives, all values, examples, proportions, conditions, properties and statements given hereinabove are to be considered as typical, illustrative, and representative, and are not necessarily optimum. In general, and in connection with the subject matter of this invention, most epoxy resin systems tend to embrittle and do not have permanent retention of physical properties with aging or upon exposure to different conditions, such as to temperatures or time for example, even temperatures below about 140° F.

When the curative agent is very reactive, such as diethylenetriamine, the parts of it used may advantageously be near the minimum of the range of about 1.8 to 20 parts, but when a less reactive agent, such as tetraethylenepentamine, is used, the parts of it which are used will be nearer the upper part of the range. The actual amount or parts of the curative which are used will vary with the desired time for the curing, the reactivity of the particular curative employed, and the degree of crosslinking desired.

The cured mixture, for use as a vibration damping material, will have, when tested on a Shore, Type A–2 durometer hardness tester, a hardness between about 10 and 70, and preferably has a hardness averaging about 17 when so tested. If the hardness is less than about 10, it will usually be too soft to give the best damping materials. By increasing the amount of the epoxy resin the hardness of the cured mixture will be higher also. For example, a mixture (parts by weight) of 100 parts "Versamid 115"
20 parts Epon 828
42 parts chlorinated paraffin (Chlorowax)
5 parts DMP 30 when cured, when tested on the Shore, Type A-2 durometer hardness tester, had a hardness between 15 and 20 and averaging about 17.

It will be understood that various changes in the details, materials and steps, which have been herein described in connection with numerous examples in order to explain the nature of the discovery, may be made by those skilled in the art within the principle and scope of the discovery as expressed in the appended claims.

This is a continuation-in-part of my copending application, Serial Number 89,888 filed February 16, 1961, now abandoned.

I claim:

1. A vibration damping material, which comprises a mixture, having a Shore, Type A-2, durometer hardness between about 10 and 70, in parts of weight, of:
   (a) about 10 to 40 parts of an epoxy resin obtained by the reaction of epichlorohydrin and a dihydric phenol, having an epoxide equivalent between about 170 to 300,
   (b) about 100 parts of a long chain, amine terminated, polyamide resin obtained by the treatment of a polymerized vegetable oil acid with a polyamine,
   (c) about 35 to 45 parts of a chlorinated paraffin whose chlorine content, by weight, does not materially exceed 50%, and
   (d) about 1.8 to 20 parts of a curing agent for said resins.

2. The material according to claim 1, wherein said curing agent is a dimethylaminomethyl phenol.

3. The method of damping the vibrations of a wall which comprises applying and confining to said wall a mixture containing:
   (a) an epoxy resin obtained by the reaction of epichlorohydrin and a dihydric phenol,
   (b) a long chain, amine terminated, polyamide resin obtained when polymerized vegetable oil acids are treated with a polyamine, such resins being used in the proportions, by weight, of about 10 to 40 parts of the epoxy resin for each 100 parts of the polyamide resin,
   (c) a plasticizer of chlorinated paraffin whose chlorine content by weight does not materially exceed 50%, and
   (d) a curing agent for said resins.

4. The method of damping the vibrations of a wall which comprises applying and confining to said wall a mixture containing:
   (a) an epoxy resin obtained by the reaction of epichlorohydrin and a dihydric phenol,
   (b) a long chain, amine terminated, polyamide resin obtained when polymerized vegetable oil acids are treated with a polyamine, such resins being used in the proportions, by weight, of about 10 to 40 parts of the epoxy resin for each 100 parts of the polyamide resin,
   (c) a plasticizer for said resins selected from the group consisting of chlorinated paraffin whose chlorine content does not exceed 50%, and liquid esters and
   (d) a curing agent for said resins.

5. A vibration damping material which comprises the mixture of:
   (a) an epoxy resin obtained by the reaction of epichlorohydrin and a dihydric phenol,
   (b) a long chain, amine terminated, polyamide resin obtained when polymerized vegetable oil acids are treated with a polyamine, such resins being used in the proportions by weight, of between about 10 to 40 parts of said epoxy resin for each 100 parts of said polyamide resin,
   (c) a chlorinated paraffin whose chlorine by weight does not materially exceed 50%, and
   (d) a curing agent for said resins.

6. A vibration damping material which comprises the mixture of:
   (a) an epoxy resin obtained by the reaction of epichlorohydrin and a dihydric phenol.
   (b) a long chain, amine terminated, polyamide resin obtained when polymerized vegetable oil acids are treated with a polyamine, such epoxy resin being by weight, between about 10 and 40 parts for each 100 parts of said polyamide resin,
   (c) plasticizer for said resin mixture selected from the group consisting of chlorinated paraffin whose chlorine content does not exceed about 50%, and liquid esters, and
   (d) an amine curing agent for said resins.

7. A material useful as a vibration damping agent on objects to which it may be confined, which comprises a mixture of:
   (a) an epoxy resin having an epoxide equivalent between about 175 to 290 and being the reaction product of epichlorohydrin and a dihydric phenol,
   (b) a long chain, amine terminated polyamide resin obtained by the treatment of a polymerized vegetable oil acid with a polyamine, in the proportions, by weight, for each 100 parts of said polyamide resin of between about 10 and 40 parts of said epoxy resin,
   (c) a plasticizer for said resins of chlorinated paraffin whose chlorine content, by weight, does not materially exceed 50%, and
   (d) a curing agent for said resins,
   (e) said mixture being substantially free of petroleum materials.

8. A material useful for damping vibrations of an object to which it is confined, which comprises the mixture of:
   (a) an epoxy resin obtained by the reaction of epichlorohydrin and a dihydric phenol,
   (b) a long chain, amine terminated, polyamide resin obtained by the treatment of a polymerized vegetable oil acid with a polyamine, said resins being used in the proportions, by weight, of between about 10 to 40 parts of said epoxy resin for each 100 parts of said polyamide resin,
   (c) a plasticizer for said resin selected from the group consisting of chlorinated paraffin having a chlorine content, by weight, not materially exceeding 50%, and liquid esters,
   (d) a tertiary amine curing agent for said resins,
   (e) the mixture being substantially free of petroleum materials.

9. A material useful for damping vibrations of an object to which it is confined, which comprises the mixture of:
   (a) an epoxy resin obtained by the reaction of epichlorohydrin and a dihydric phenol,
   (b) a long chain, amine terminated, polyamide resin, obtained by the treatment of a polymerized vegetable oil acid with a polyamine, in the proportions, by weight, of between about 10 to 40 parts of said epoxy resin for each 100 parts of said polyamide resin,
   (c) a plasticizer for said resins of chlorinated paraffin whose chlorine content, by weight, does not materially exceed about 50%, and
   (d) an amine curing agent for such resins,
   (e) the mixture being substantially free of petroleum materials.

10. The material according to claim 9, wherein the curing agent is a tertiary amine.

11. The method of making a self curing compound useful as a vibration damping material, which comprises merely mixing together
   (a) a quantity of the resinous reaction product of epichlorohydrin and bis (4-hydroxyphenyl) dimethylmethane with a long chain, amine terminated, polyamide resin which is a condensation polymer of dimerized and trimerized vegetable oil, unsaturated fatty acids, and one of aryl and alkyl polyamines, the epoxy resin content of the mixture being not less than about 10 parts, by weight, and not more than about 40 parts, by weight, for each 100 parts by weight of the polyamide resin,
   (b) a chlorinated plasticizer whose chlorine content, by weight, does not materially exceed 50%, and
   (c) an amine curing agent for the said resins.

12. A compound useful as a vibration damping material which comprises a mixture of:
   (a) a quantity of the resinous reaction product of epichlorohydrin and a dihydric phenol, and a long chain, amine terminated, polyamide resin which is the condensation polymer of dimerized and trimerized vegetable oil, unsaturated fatty acids and one of aryl and alkyl polyamines, the epoxy resin content of the mixture being between about 10 and 40 parts, by weight, for each 100 parts, by weight, of the polyamide resin,
   (b) a chlorinated paraffin whose chlorine content, by weight, does not materially exceed 50%, and
   (c) and amine curing agent for said resins,
   (d) said mixture being substantially free of petroleum materials.

13. A material useful for damping vibrations of an object to which it may be confined comprising a mixture of:
   (a) resinous reaction product of epichlorohydrin and a dihydric phenol,
   (b) a long chain, amine terminated, polyamide resin obtained by the treatment of dimerized and polymerized vegetable oil acids with a polyamine, in the proportions, by weight, of at least about 10 and not more than about 40 parts of said reaction product for each 100 parts of said polyamide resin,
   (c) a plasticizer for said resins of chlorinated paraffin whose chlorine content does not materially exceed 50%, and
   (d) a dimethylaminomethyl phenol curing agent.

14. A material useful for damping vibrations of an object to which it is confined, which consists essentially of the mixture of:
   (a) an epoxy resin obtained by the reaction of epichlorohydrin with a dihydric phenol,
   (b) a long chain, amine terminated, polyamide resin obtained by the treatment of a polymerized vegetable oil acid with a polyamine, in the proportions, by weight, of at least about 10 and not more than about 40 parts of the epoxy resin for each 100 parts of the polyamide resin,
   (c) a chlorinated paraffin plasticizer for said resins, whose chlorine content does not materially exceed about 50%, and
   (d) a tertiary amine curing agent for such resins.

15. A vibration damping material which consists essentially of a mixture, having a Shore, Type A–2, durometer hardness between about 10 and 70, in parts by weight, of:
   (a) about 10 to 40 parts of an epoxy resin obtained by the reaction of epichlorohydrin and a dihydric phenol, having an epoxide equivalent between about 170 to 300,
   (b) about 100 parts of a long chain, amine terminated, polyamide resin obtained by the treatment of a polymerized vegetable oil acid with a polyamine,
   (c) about 35 to 45 parts of a chlorinated paraffin whose chlorine content, by weight, does not materially exceed 50%, and
   (d) about 1.8 to 20 parts of an amine curing agent for said resins.

References Cited by the Examiner

UNITED STATES PATENTS

| | | | |
|---|---|---|---|
| 2,576,073 | 11/51 | Kropa et al. | 50—268 |
| 2,628,946 | 2/53 | Juda et al. | 260—17.3 |
| 2,669,521 | 2/54 | Bierly | 260—28.5 |
| 2,843,557 | 7/58 | Safford | 260—18 |
| 2,867,592 | 1/59 | Morris et al. | 260—18 |
| 2,951,001 | 8/60 | Rubenstein | 260—18 |
| 2,976,256 | 3/61 | Whittier et al. | 260—37 |
| 2,977,332 | 3/61 | Zumstein | 260—47 |
| 3,075,932 | 1/63 | Edwards et al. | 260—18 |
| 3,105,771 | 10/63 | Simpson et al. | 260—18 |

FOREIGN PATENTS 819,718  9/59  Great Britain.

LEON J. BERCOVITZ, *Primary Examiner.*

A. D. SULLIVAN, JAMES A. SEIDLECK, DONALD E. CZAJA, *Examiners.*